United States Patent [19]

Kokubu et al.

[11] Patent Number: 5,462,804
[45] Date of Patent: Oct. 31, 1995

[54] STABILIZED PARTICLE OF SODIUM PERCARBONATE

[75] Inventors: Jun Kokubu; Yasuo Hiro; Katsuhiko Hisano; Susumu Watanabe, all of Mie, Japan

[73] Assignee: Mitsubishi Gas Chemical Co., Ltd., Tokyo, Japan

[21] Appl. No.: 239,390

[22] Filed: May 6, 1994

[30] Foreign Application Priority Data

| May 6, 1993 | [JP] | Japan | 5-105551 |
| May 6, 1993 | [JP] | Japan | 5-105552 |
| Jun. 23, 1993 | [JP] | Japan | 5-152245 |

[51] Int. Cl.$^6$ .................. B32B 5/16; C11D 3/00
[52] U.S. Cl. .................. 428/402.24; 252/97; 252/174.13; 252/174.14
[58] Field of Search .............. 428/402.24; 252/97, 252/99, 174.13, 174.14, 186.27; 423/415.2, 274

[56] References Cited

U.S. PATENT DOCUMENTS

| 3,992,317 | 11/1976 | Brichard et al. | 252/186 |
| 4,105,827 | 8/1978 | Brichard et al. | 428/403 |
| 4,135,010 | 1/1979 | Klebe et al. | 427/215 |
| 4,194,025 | 3/1980 | Klebe et al. | 427/215 |
| 4,325,933 | 4/1982 | Matsumoto et al. | 423/415.2 |
| 5,219,549 | 6/1993 | Onda et al. | 423/415.2 |
| 5,312,557 | 5/1994 | Onda et al. | 252/99 |
| 5,332,518 | 7/1994 | Kuroda et al. | 252/99 |
| 5,346,680 | 9/1994 | Roester et al. | 423/274 |
| 5,366,655 | 11/1994 | Yamasita et al. | 252/186.27 |

FOREIGN PATENT DOCUMENTS

| 0405797 | 1/1991 | European Pat. Off. |
| 2226460 | 11/1974 | France . |
| 2424228 | 11/1979 | France . |
| 2622610 | 12/1976 | Germany . |
| 1538893 | 1/1979 | United Kingdom . |

*Primary Examiner*—Donald P. Walsh
*Assistant Examiner*—John N. Greaves
*Attorney, Agent, or Firm*—Sughrue, Mion, Zinn, Macpeak & Seas

[57] ABSTRACT

A stabilized sodium percarbonate particle includes a sodium percarbonate particle having at least one coating layer thereon, wherein the at least one coating layer includes (a) a silicate; (b) magnesium sulfate; and (c) an alkali metal salt selected from the group consisting of alkali metal carbonates, alkali metal bicarbonates and alkali metal sulfate. The present sodium percarbonate particle is good in solubility and is excellent in its formulation stability with detergent.

39 Claims, No Drawings

STABILIZED PARTICLE OF SODIUM PERCARBONATE

FIELD OF THE INVENTION

The present invention relates to a particle of sodium percarbonate which has high storage stability and which is useful for a synthetic detergent for family use containing a bleach component, etc., and a method for its preparation.

BACKGROUND OF THE INVENTION

It is well known that hydrogen peroxide, such as in sodium percarbonate and sodium perborate, is formulated in a powdery detergent composition (synthetic detergent for family use) as a bleach component. Hydrogen peroxide, such as in sodium percarbonate and sodium perborate, dissolves in laundry to perform bleaching action.

In this case, the solubility rate of sodium perborate at a low temperature is small, so it is not preferable for a bleach component formulated in a detergent in Japan, where cold water or tepid water is used in laundry. On the other hand, the solubility rate of sodium percarbonate at a low temperature is high, and the bleaching effect is sufficiently performed, so the need for it has increased rapidly in recent years.

However, sodium percarbonate is relatively sensitive to water content and is easy dissolved at room temperature by water content in a detergent composition or by moisture or water content in the air. Further, there is a case that substances such as zeolites or enzymes, which accelerate the dissolution of sodium percarbonate, are contained in detergent composition, and it is dissolved by contacting with the substances.

Thus, until this time, several methods in which the dissolution of sodium percarbonate is prevented or prohibited to obtain stabilized sodium percarbonate have been suggested. For example, there are methods in which stability is performed by adding a stabilizer such as sodium metasilicate, a magnesium compound and a chelating agent at the time of crystallization; by adding additives such as a binder or phosphates at the time of wet granulation; and by coating a dried surface of sodium percarbonate.

Among these, the third method (that is, the method in which a particle of sodium percarbonate is coated by several kinds of coating agents) is the most powerful method.

As the coating agent, a salt of alkaline earth metal or a mixture of sodium carbonate and sodium sulfate, etc., are suggested.

As the method in which a particle is coated with an alkaline earth metal salt, the method described in Japanese Patent Publication Sho 57-7081 is known. This method is the method in which the surface of sodium percarbonate is catalytically reacted with an alkaline earth metal salt solution, and a membrane comprising an alkaline earth metal carbonate is formed on the surface of the sodium percarbonate. This method certainly can raise somewhat the stability of sodium percarbonate, but there are two problems as described below.

One problem is that when sodium carbonate in sodium percarbonate is reacted with an alkaline earth metal salt, the hydrogen peroxide which is liberated decomposes at the time of drying, so the effective component of sodium percarbonate decreases.

Another problem is that by the production of an insoluble alkaline earth metal carbonate, the solubility rate becomes extremely small, so it is difficult to use.

On the other hand, in case of the method in which a particle is coated with a mixed salt of sodium carbonate and sodium percarbonate or sodium sulfonate (Japanese Patent Publication Sho 58-24361), the solubility is relatively good, but the stability of the formulation with detergent does not reach a practical level, although it improves somewhat as compared with uncoated sodium percarbonate.

SUMMARY OF THE INVENTION

A problem that the present invention is directed to solving is to develop a particle of sodium percarbonate which satisfies both stability and solubility requirements at the same time.

As a result of extensive research, it has now been found that a stabilized sodium percarbonate particle which comprises a sodium percarbonate particle having at least one coating layer thereon, wherein the at least one coating layer comprises a silicate, magnesium sulfate, and an alkali metal salt selected from the group consisting of alkali metal carbonates, alkali metal bicarbonates and alkali metal sulfates, has a fast solubility and good formulation stability with detergent, and the inventors thus accomplished the present invention.

DETAILED DESCRIPTION OF THE INVENTION

Hereinafter, the present invention will be described in more detail.

Coating of sodium percarbonate is conducted as follows. That is, on a sodium percarbonate particle, an aqueous solution of a silicate or a mixed aqueous solution of a silicate and an alkali metal carbonate is sprayed and dried to form a first coating layer, then an aqueous solution of magnesium sulfate independently or a mixed aqueous solution of magnesium sulfate and an alkali metal carbonate or sulfate is sprayed and dried to form a second coating layer.

Further, on a sodium percarbonate particle, the coating layer may be formed by spraying the sodium percarbonate particle simultaneously using different nozzles and drying the above aqueous solutions.

When the order of spraying is reversed, i.e., at first, a solution containing magnesium sulfate is sprayed, then a solution of a silicate and a solution of an alkali metal carbonate is sprayed, the thus obtained sodium percarbonate particle has a decreased amount of active oxygen.

Further, on a sodium percarbonate particle, the coating layer may be formed by spraying an aqueous solution of a silicate, an aqueous solution of magnesium sulfate and an aqueous solution containing an alkali metal bicarbonate or sulfate simultaneously or sequentially using different nozzles and drying.

Sodium percarbonate used in the present invention is obtained by cohesive-granulating, using a miscible-type granulator, sodium percarbonate (water content of 6–15%) produced by reacting, crystallizing and dehydrating using a known method, with a binder, then rectifying using an extruder and drying.

Further, sodium percarbonate which is produced by mixing wet powdery sodium percarbonate with recovered sodium percarbonate partially containing a coating agent component, such as a silicate component, magnesium sulfate component or alkali metal sulfate component recovered from granulation steps and/or coating steps, etc., then granulating using the above-mentioned procedure, is preferably used.

The composition ratio of the wet powdery sodium percarbonate and the recovered sodium percarbonate is preferably within the ratio from 50:50 to 99:1. Particularly, when the recovered sodium percarbonate is finely powdered such that the diameter of the recovered sodium percarbonate is 300 μm and below, preferably from 5 to 100 μm, the stability of sodium percarbonate further increases.

The sodium percarbonate particle used in the present invention which is at the post-granulation step and pre-coating step is usually from 300 to 3000 μm, preferably from 300 to 2000 μm, more preferably from 500 to 1000 μm in diameter.

As the silicate as a coating agent, a sodium salt, such as sodium orthosilicate, sodium metasilicate, water-glass No. 1, No. 2, No. 3, etc., can be used. Among these, water-glasses are liquid and are preferably used in view of convenience.

The coating amount of the silicate is preferably 0.01 mole to 0.06 mole based on $SiO_2$ per mole of uncoated sodium percarbonate ($Na_2CO_3 \cdot 3/2H_2O_2$; molecular weight: 157). That is, the silicate is coated in an amount of 0.3 parts to 2.2 parts based on $SiO_2$ (molecular weight: 60.3) per 100 parts of sodium percarbonate. In the case that the coating amount of the silicate is too small, the coverage of the coating decreases, and the formulation stability with detergent becomes insufficient. In contrast, in the case where the coating amount of the silicate is too large, the solubility rate becomes slow.

As the alkali metal bicarbonate as a coating agent, sodium bicarbonate, potassium bicarbonate, lithium bicarbonate, etc., may be used. Further, these can be used in combination. Among these, sodium carbonate is most preferable from the viewpoint of economical efficiency. The coating amount of the alkali metal bicarbonate is preferably 0.05 mole to 0.25 mole per mole of uncoated sodium percarbonate. That is, in the case of sodium bicarbonate (molecular weight: 84), the alkali metal bicarbonate is present in an amount of 2.7 to 13.4 parts per 100 parts of sodium percarbonate (molecular weight: 157). In the case of 0.05 mole of alkali metal bicarbonate and below per mole of uncoated sodium percarbonate, the formulation stability with detergent is insufficient. In contrast, in the case of 0.25 mole of alkali metal bicarbonate and more per mole of uncoated sodium percarbonate, not only does the solubility rate decrease, but also economical efficiency is not preferable.

As the alkali metal carbonate as a coating agent, sodium carbonate, potassium carbonate, lithium carbonate, etc., may be used. Further, these can be used in combination. Among these, sodium carbonate is most preferable from the viewpoint of economical efficiency.

The coating amount of the alkali metal carbonate is preferably 0.075 mole to 0.18 mole per mole of uncoated sodium percarbonate. That is, in the case of sodium carbonate (molecular weight: 106), the alkali metal carbonate is from 5 parts to 12 parts per 100 parts of sodium percarbonate. In case that the coating amount of the alkali metal carbonate is 0.075 mole and less, the formulation stability with detergent decreases. In contrast, in the case of an alkali metal carbonate coating amount of 0.18 mole and more, not only does the solubility rate become slow, but also it is not preferable in view of economical efficiency.

As the alkali metal sulfate as a coating agent, sodium sulfate, potassium sulfate, lithium sulfate, etc., may be used. Further, these can be used in combination. Among these, sodium sulfate is most preferable from the viewpoint of economical efficiency.

The coating amount of the alkali metal sulfate is preferably from 0.05 mole to 0.20 mole per mole of uncoated sodium percarbonate. That is, in the case that the alkali metal sulfate is sodium sulfate anhydride (molecular weight: 142), it is present in an amount of from 4.5 parts to 18 parts per 100 parts of sodium percarbonate. In case that coating amount of the alkali metal sulfate is 0.05 mole and less, the formulation stability with detergent insufficient. In contrast, in case of an alkali metal sulfate coating amount of 0.2 mole and more, not only does the solubility rate become slow, but it is also not preferable in view of economical efficiency.

In the present invention, as the alkali metal salt, alkali metal sulfate is preferably used in combination with alkali metal bicarbonate. As the alkali metal sulfate and alkali metal bicarbonate, the above-mentioned compounds can be used, preferably, sodium sulfate and sodium bicarbonate.

The coating amount is desirably from 0.05 mole to 0.2 mole of alkali metal sulfate and from 0.04 mole to 0.17 mole of alkali metal bicarbonate per mole of uncoated sodium percarbonate.

The coating amount of magnesium sulfate is preferably from 0.006 mole to 0.06 mole per mole of uncoated sodium percarbonate. That is, magnesium sulfate (molecular weight: 120.3) is coated in an amount of from 0.45 parts to 4.5 parts per 100 parts of sodium percarbonate. In the case that coating amount of magnesium sulfate is 0.006 mole and less, the formulation stability with detergent becomes insufficient. In contrast, in the case of a magnesium sulfate coating amount of 0.06 mole and more, the solubility rate becomes slow.

The ratio of each coating agent is not limited, as long as it is within the range described in the specification and recited in the claims of the present application. Usually, the ratio of the alkali metal salt:silicate:magnesium sulfate is within the range from 1:0.03:0.02 to 1:1.2:1.2, preferably, from 1:0.1:0.1 to 1:0.4:0.4, based on the mole ratio.

In particular, when an alkali metal bicarbonate is used as the alkali metal salt, the ratio of the alkali metal bicarbonate:silicate:magnesium sulfate is usually within the range from 1:0.03:0.024 to 1:1.2:1.2, preferably from 1:0.1:0.1 to 1:0.2:0.2, based on the mole ratio.

When an alkali metal carbonate is used as the alkali metal salt, the ratio of alkali metal carbonate:silicate:magnesium sulfate is usually within the range from 1:0.05:0.03 to 1:0.8:0.8, preferably from 1:0.1:0.1 to 1:0.4:0.4, based on the mole ratio.

When an alkali metal sulfate is used as the alkali metal salt, the ratio of alkali metal sulfate:silicate:magnesium sulfate is usually within the range from 1:0.05:0.03 to 1:1.2:1.2, preferably from 1:0.1:0.1 to 1:0.2:0.2, based on the mole ratio.

When a combination of an alkali metal sulfate and an alkali metal bicarbonate is used as the alkali metal salt, the ratio of alkali metal sulfate:silicate:magnesium sulfate:alkali metal bicarbonate is usually within the range from 1:0.05:0.03:0.2 to 1:1.2:1.2:0.85, preferably from 1:0.1:0.1:0.4 to 1:0.2:0.2:0.85, based on the mole ratio.

Additionally, besides the above-mentioned coating agent, a chelating agent or stabilizer, such as ethylenediaminetetraacetic acid (EDTA) or salts thereof (EDTA-4Na, etc.), nitrilotriacetic acid, etc., may be used in combination with the coating agent.

Particularly, when a chelating agent is added into a mixture of magnesium sulfate and sodium bicarbonate, crystallization does not occur at all. That is, if a chelating agent is not added, depending upon the concentration of the aqueous solution, there is a case that crystallization appears partially several days after the preparation of the liquid.

When sodium percarbonate is coated, the solvent of these coating agents is selected from solvents which dissolve the coating agent, and water, which has high solubility and is safe and cheap, is most preferable.

The concentration of the coating agent at the time of spraying may be not more than the saturated concentration of solubility at the temperature in use; however, when the concentration is too small, not only does it require time to dry, but also the calories of water vaporized becomes large, and thus a low concentration is not preferable from the viewpoint of economical efficiency. On the other hand, when the concentration is too high, crystallization may occur and block tubes or nozzles, and thus a high concentration is not preferable. Thus, the liquid concentration of a silicate is preferably from 0.5% by weight to 9% by weight, more preferably from 1% by weight to 6% by weight, based on $SiO_2$. On the other hand, the liquid concentration of magnesium sulfate is preferably from 0.2% by weight to 25% by weight, more preferably from 0.5% by weight to 20% by weight. The liquid concentration of an alkali metal sulfate is preferably from 3% by weight to 20% by weight, more preferably from 5% by weight to 15% by weight. The liquid concentration of an alkali metal bicarbonate is preferably from 3% by weight to 9% by weight, more preferably from 5% by weight to 8% by weight.

The liquid concentration of an alkali metal carbonate is preferably from 5% by weight to 20% by weight, more preferably from 7% by weight to 15% by weight.

The temperature of the sodium percarbonate at the time of spray-drying is preferably from 40° to 95° C., more preferably from 50° to 90° C. In case that the temperature of the sodium percarbonate is too low, particles of sodium percarbonate agglomerate, and the embodiment is not preferable. On the other hand, in the case that the temperature of the sodium percarbonate is too high, sodium percarbonate tends to decompose, and it is hard to make a uniform coating because of the growth of crystals of the coating agent.

The present sodium percarbonate particle has an excellent solubility rate and has excellent formulation stability with detergent. The present sodium percarbonate is uniformly coated on its surface with a silicate, magnesium sulfate, and at least one of an alkali metal carbonate, bicarbonate, and sulfate and/or a reaction product thereof, and can show stabilizing action by cutting off water or another kicker. By using the combination of the components used in the present invention as a coating agent, a particularly excellent stabilizing effect is obtained.

The sodium percarbonate particle coated in accordance with the present invention is not only excellent in its formulation stability with a zeolite or detergent which has a characteristic of a kicker, but also has an excellent solubility rate and can be used in low temperature laundry.

Hereinafter the present invention will be explained in more detail using examples and comparative examples. The present invention is not limited to these examples. The use of % in the examples means % by weight, unless otherwise described expressly.

EXAMPLE 1

300 g of sodium percarbonate having a mean diameter of 500 μm (active oxygen 14.4%) was placed on a multipore plate of a fluid dry coater (Yamato Scientific Co., Ltd., PULVIS MINI BED), then air at 0.25 m³/min was sent to make fluidization. Thereafter, by warming inlet air, the temperature of the fluidizing sodium percarbonate was raised to 75 ° C. After the temperature was steady at 75° C., to keep it in a fluid state, 225 g of an aqueous solution of water-glass No. 1 (water-glass No. 1 concentration of 2 wt % based on $SiO_2$) was sprayed from a spray nozzle located 10 cm above the multipore plate over 39 minutes at a flow rate of 7.5 g/min. After spray completion, the sample was dried for 5 minutes, and the first coating layer was thereby formed. Then, after a change of the nozzle, 500 g of a mixed aqueous solution of magnesium sulfate and sodium bicarbonate ($MgSO_4$ concentration of 0.9 wt %, $NaHCO_3$ concentration of 6.6 wt %) was sprayed at a flow rate of 7.5 g/min over 67 minutes. Similarly as the above, after completion of the spraying, the sample was dried for 5 minutes, and the second coating layer was thereby formed. In the coating, the temperature of the sodium percarbonate was controlled from 73° to 77° C. The coating amount of each component as solids content was as follows:

Water-glass No. 1 (as $SiO_2$) in the first coating layer: 4.5 g (1.5% of the sodium percarbonate to be coated)

Magnesium sulfate in the second coating layer: 4.5 g (1.5% of the sodium percarbonate to be coated)

Sodium bicarbonate in the second coating layer: 33.0 g (11% of the sodium percarbonate to be coated).

After cooling, the coated sodium percarbonate was taken out and no aggregate was observed.

Active oxygen of the obtained sodium percarbonate analyzed to 12.5%.

From this value, decomposition of the active oxygen at coating time was extremely small, with the coating agent being coated the same as the theoretical value. (Theoretical value: 14.4%×1/(1+0.14)=12.6%)

Further, coated sodium percarbonate was mixed with a zeolite and detergent to investigate the storage stability test. The result together with the result of the solubility rate is shown in Table 1. Formulation stability was very good, and great improvement of stability as compared with uncoated sodium percarbonate described below was recognized.

Solubility Test 5 g of sodium percarbonate particle was charged into 1 l of water and stirred at 200 rpm. The time for the particle to dissolve completely was measured by the electrical conductance method.

Storage Stability Test 1

1 g of synthetic zeolite 4A powder which was sufficiently absorbed with moisture for 1 day at 30° C., relative humidity of 80%, and 1 g of sodium percarbonate were charged into a polyethylene bag (Trade name: UNI PACK A-4, Seisan Nippon Sya Co., Ltd., water permeable) and mixed sufficiently. The mixture stood for 4 days at 30° C. and a relative humidity of 80%, and active oxygen of pre- and post-storage was analyzed, and formulation stability with a zeolite was investigated.

Storage Stability Test 2

To 1300 g of commercially available compact detergent (containing a zeolite and enzyme, etc.), 200 g of coated or uncoated sodium percarbonate (13.3% against the detergent) was homogeneously mixed, put into carton board box, and then sealed with vinyl tape. The mixture was stored in a constant temperature bath for 21 days at 30° C. and a relative humidity of 80%. The active oxygen amount of the samples was determined by sodium thiosulfate precipitation. The residual rate of active oxygen was calculated according to the following formula. Residual rate of active oxygen (%)= (active oxygen at post-storage/active oxygen at pre-storage)×100

EXAMPLE 2

Coated sodium percarbonate was obtained using the same procedures as in Example 1, except that potassium bicarbonate was used instead of sodium bicarbonate as a coating agent.

Potassium bicarbonate: 33.0 g (11.0% of sodium percarbonate to be coated)

Water-glass No. 1 (as $SiO_2$): 4.5 g (1.5% of sodium percarbonate to be coated)

Magnesium sulfate: 4.5 g (1.5% of sodium percarbonate to be coated)

Active oxygen of the obtained sodium percarbonate analyzed to 12.6%.

This value shows that without decomposing the active oxygen at the coating time, the coating agent was coated the same as the theoretical value. Further, solubility was investigated using the same procedure as in Example 1, and it was found that the sample dissolved by 2.5 minutes.

Formulation stability was investigated in the same manner as Example 1, and it was good. The result is shown in Table 1.

EXAMPLE 3

Coated sodium percarbonate was obtained using the same procedures as in Example 1, except that sodium metasilicate was used instead of water-glass No. 1 as a coating agent, the coating amount was changed, and a chelating agent corresponding to 0.5% of the amount of the coating was added to the mixed solution of magnesium sulfate and sodium bicarbonate in order to stabilize the solution.

Sodium bicarbonate: 33.0 g (11.0% of sodium percarbonate to be coated)

Sodium meta silicate: 3.0 g (1.0% of sodium percarbonate to be coated)

Magnesium sulfate: 4.5 g (1.5% of sodium percarbonate to be coated)

Ethylenediaminetetraacetic acid tetrasodium salt: 1.5 g (1.5% of sodium percarbonate to be coated)

Active oxygen of the obtained sodium percarbonate, solubility and formulation stability were investigated, solubility was excellent, and formulation stability was good. The results are shown in Table 1.

The mixed solution of magnesium sulfate, sodium bicarbonate and chelating agent was stable and did not give any precipitate after storing a day.

EXAMPLE 4

12 kg of sodium percarbonate having a mean diameter of 500 μm (active oxygen: 14.4%) was placed on a multipore plate of a fluid drying apparatus (Fuji Paudal Co., Ltd., "MIDGET-DRYER"), then air at 3.2 m³/min was sent to make fluidization. Thereafter, by warming inlet air to from 120° to 150° C., the temperature of the fluidizing sodium percarbonate was raised to 75° C. After the temperature was steady at 75° C., to keep it in a fluid state, a mixed solution of sodium bicarbonate and magnesium sulfate (sodium bicarbonate concentration of 8 wt %, magnesium sulfate of 1 wt %) and an aqueous solution of sodium metasilicate (1.2 wt % based on $SiO_2$) was sprayed simultaneously from different spray nozzles located 40 cm above the multipore plate.

Spraying of 12 kg of the mixed solution of sodium bicarbonate and magnesium sulfate took 150 minutes at a speed of 80 g/min. On the other hand, spraying of 10 kg of the aqueous solution of sodium metasilicate took 150 minutes at a speed of 67 g/min., and the coating finished at almost the same time. The temperature during the coating was controlled from 73° to 77° C. After completion of the coating, heated air continued to be sent for 5 minutes to dry. Next, heating from the air heater finished, and the sample was cooled with a cool air flow. After cooling, the coated sodium percarbonate was taken out, and no aggregate was observed.

The coating amount of each component as solids content was as follows:

$NaHCO_3$: 0.96 kg (8.0% of the sodium percarbonate to be coated)

Sodium metasilicate (as $SiO_2$): 0.12 kg (1.0% of the sodium percarbonate to be coated)

Magnesium sulfate: 0.12 kg (1.0% of the sodium percarbonate to be coated)

Active oxygen of the obtained sodium percarbonate, solubility and formulation stability were investigated. The results are shown in Table 1.

Solubility and formulation stability in case of simultaneous spraying were both excellent as in the case of multi-spraying of Examples 1, 2 and 3.

EXAMPLE 5

Coated sodium percarbonate was obtained using the same procedures as in Example 4, except that to the mixed solution of magnesium sulfate and sodium bicarbonate, EDTA-4Na as a chelating agent was added in an amount of 0.5% corresponding to the coating amount, the coating amount was changed, and water-glass No. 1 was used instead of sodium metasilicate.

The spray time of the two liquids was finished after about 188 minutes. Active oxygen of the obtained sodium percarbonate, solubility and formulation stability were investigated. The results are shown in Table 1.

$NaHCO_3$: 1.2 kg (10.0% of the sodium percarbonate to be coated)

Water-glass No. 1 (as $SiO_2$): 0.15 kg (1.25% of the sodium percarbonate to be coated)

Magnesium sulfate: 0.15 kg (1.25% of the sodium percarbonate to be coated)

Ethylenediaminetetraacetic acid tetrasodium salt: 1.5 g (1.5% of sodium percarbonate to be coated)

As can be seen from Table 1, sodium percarbonate produced according to the Examples of the present invention was excellent in solubility (time required to dissolve completely was fast, i.e., from 2 to 2.5 min.), and formulation stability with detergent was good (only 10% decomposition even after 21 days storage) and found to have a balanced good property.

COMPARATIVE EXAMPLE 1

Active oxygen, solubility and formulation stability of uncoated sodium percarbonate which was used as a raw material in the present invention were investigated. The results are shown in Table 1 for comparison.

COMPARATIVE EXAMPLE 2

Coated sodium percarbonate was obtained using the same procedures as in Example 1, except that the spraying of the second layer was not conducted.

Active oxygen, solubility and formulation stability of the obtained sodium percarbonate were investigated. The results are shown in Table 1. The formulation stability was only a little better than in the uncoated sample of COMPARATIVE EXAMPLE 1 and did not show a great improvement like in Example 1. Further, the solubility was rather bad, which may have been because of the use of only one component of $SiO_2$.

COMPARATIVE EXAMPLE 3

Coated sodium percarbonate was obtained using the same procedures as in Example 1, except that the spraying of the first layer was not conducted.

Potassium bicarbonate: 33.0 g (11.0% of sodium percarbonate to be coated)

Magnesium sulfate: 4.5 g (1.5% of sodium percarbonate to be coated)

Active oxygen, solubility and formulation stability of the obtained sodium percarbonate were investigated. The results are shown in Table 1. Although the solubility was good, the formulation stability did not show a great improvement like in Example 1.

COMPARATIVE EXAMPLE 4

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 m³/min was sent to make fluidization. Thereafter, by warming inlet air, the temperature of the fluidizing sodium percarbonate was raised to 75° C. After the temperature was steady at 75° C., to keep it in a fluid state, 180 g of an aqueous solution of magnesium chloride (10% concentration of magnesium chloride) was sprayed from a spray nozzle located 10 cm above the multipore plate over 36 minutes at a flow rate of 5 g/min. After spray completion, the contents were removed from the apparatus, moved to a vacuum dryer, and dried for 4 hours at 50° C. under 3 mmHg.

Active oxygen, solubility and formulation stability of the obtained sodium percarbonate were investigated. The results are shown in Table 1. The formulation stability did not show a great improvement like in Example 1. In particular, the formulation stability with a zeolite was low, like the uncoated sample in COMPARATIVE EXAMPLE 1.

Further, a great decrease of active oxygen which was over the value of dilution by the coating agent was observed.

Theoretical conc. of active oxygen:

$$14.4\% \times 1/(1+0.06)=13.6\%$$

Actually measured conc. of active oxygen: 12.9%

Also, the sample took 5 minutes to dissolve in COMPARATIVE EXAMPLE 4, so it is not applicable when laundry is conducted at a low temperature.

COMPARATIVE EXAMPLE 5

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 m³/min was sent to make fluidization. Thereafter, by warming inlet air, the temperature of the fluidizing sodium percarbonate was raised to 50° C. After the temperature was steady at 50° C., to keep it in a fluid state, 129 g of an aqueous solution of a mixed salt of sodium carbonate and sodium bicarbonate (sesquicarbonate) (8.6% concentration of sodium carbonate, 3% of sodium bicarbonate) was sprayed from a spray nozzle located 10 cm above the multipore plate over 26 minutes at a flow rate of 5 g/min. For 10 minutes after spray completion, only gas at the same temperature continued to be sent, and drying was completed. Then, the gas was changed to cool wind, and the sample was cooled to 30° C. Then, the coated sodium percarbonate was removed from the apparatus, and little aggregates were observed.

Sodium bicarbonate: 3.9 g (1.3% of sodium percarbonate to be coated)

Sodium carbonate: 11.1 g (3.7% of sodium percarbonate to be coated)

Active oxygen, solubility and formulation stability of the obtained sodium percarbonate were investigated. The results are shown in Table 1. The solubility was preferable, but the formulation stability did not show a great improvement like in Example 1.

COMPARATIVE EXAMPLE 6

Coated sodium percarbonate was obtained using the same procedures as in Example 1, except that the coating amount of water-glass No. 1 was 12.5%, after formulation of the first coating layer, the second coating layer was formulated using only an aqueous solution of magnesium sulfate, without using sodium bicarbonate, and total coating amount was the same as in Example 1.

Water-glass No. 1 (as $SiO_2$): 37.5 g (12.5% of sodium percarbonate to be coated)

Magnesium sulfate: 4.5 g (1.5% of sodium percarbonate to be coated)

Active oxygen, solubility and formulation stability of the obtained sodium percarbonate were investigated. The results are shown in Table 1.

TABLE 1

|  | EXAMPLE | | | | | COMPARATIVE EXAMPLE | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Solubility (min.) | 2.5 | 2.5 | 2.0 | 2.0 | 2.5 | 1.5 | 3.5 | 1.5 | 5.0 | 2.5 | 9.0 |
| Storage Stability 1 (%) | 95 | 90 | 92 | 91 | 93 | 30 | 65 | 78 | 43 | 48 | 85 |
| Storage Stability 2 (%) | 92 | 88 | 90 | 90 | 91 | 50 | 59 | 70 | 75 | 64 | 70 |

EXAMPLE 6

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 m³/min was sent to make fluidization. Thereafter, by warming inlet air, the temperature of the fluidizing sodium percarbonate was raised to 75° C. After the temperature was steady at 75° C., to keep it in a fluid state, 600 g of mixed solution of sodium carbonate and water-glass No. 1 (sodium carbonate concentration of 5.5 wt %, water-glass No. 1 concentration of 1 wt % based on $SiO_2$) was sprayed from a spray nozzle located 10 cm above the multipore plate over 75 minutes at a flow rate of 8 g/min. After spray completion, the sample was dried for 5 minutes, and the first coating layer was thereby formed. Then, after a change of the nozzle, 90 g of the solution of magnesium sulfate (5.5 wt %) was sprayed at a flow rate of 5 g/min over 18 minutes. Similarly as the above, after completion of the spraying, the sample was dried for 5 minutes, and the second coating layer was thereby formed. In the coating, the temperature of the sodium percarbonate was controlled from 73° to 77° C. The coating amount of each component as solids content was as follows:

$Na_2CO_3$ in the first coating layer: 33.0 g (11% of the sodium percarbonate to be coated)

Water-glass No. 1 (as $SiO_2$) in the first coating layer: 6.0 g (2.0% of the sodium percarbonate to be coated)

Magnesium sulfate in the second coating layer: 4.5 g (1.5% of the sodium percarbonate to be coated).

After cooling, the coated sodium percarbonate was taken out, and no aggregate was observed.

Active oxygen of the obtained sodium percarbonate analyzed to 12.6%.

This shows that there was no decomposition of the active oxygen at the coating time, and that the coating agent was coated the same as the theoretical value. (Theoretical value: 14.4%×1/(1+0.145)=12.6%)

The obtained sodium percarbonate was dissolved by 2.5 min.

Further, coated sodium percarbonate was mixed with a zeolite and detergent to investigate the storage stability test. The result together with the result of the solubility rate is shown in Table 2. Formulation stability was very good, and a great improvement of stability as compared with uncoated sodium percarbonate described below was recognized.

EXAMPLE 7

Coated sodium percarbonate was obtained using the same procedures as in Example 6, except that amount of the coating was changed as set forth below.

Sodium carbonate: 24.8 g (8.3% of sodium percarbonate to be coated)

Water-glass No. 1 (as $SiO_2$): 4.5 g (1.5% of sodium percarbonate to be coated)

Magnesium sulfate: 10.5 g (3.5% of sodium percarbonate to be coated)

Active oxygen of the obtained sodium percarbonate analyzed to 12.7%.

This value shows that without decomposing the active oxygen at the coating time, the coating agent was coated the same as the theoretical value. Further, solubility was investigated using the same procedure as in Example 1, and it was found that the sample dissolved by 2.5 minutes.

Formulation stability was investigated in the same manner as Example 1, and it was good. The result is shown in Table 2.

EXAMPLE 8

Coated sodium percarbonate was obtained using the same procedures as in Example 6, except that potassium carbonate was used instead of sodium carbonate and that water-glass No. 3 was used instead of water-glass No. 1.

Potassium carbonate: 33.0 g (11.0% of sodium percarbonate to be coated)

Water-glass No. 3 (as $SiO_2$): 6.0 g (2.0% of sodium percarbonate to be coated)

Magnesium sulfate: 4.5 g (1.5% of sodium percarbonate to be coated)

Active oxygen of the obtained sodium percarbonate, solubility and formulation stability were investigated, and the results are shown in Table 2.

EXAMPLE 9

12 kg of sodium percarbonate having a mean diameter of 500 μm (active oxygen: 14.4%) was placed on a multipore plate of a fluid drying apparatus (Fuji Paudal Co., Ltd., "MIDGET-DRYER"), then air at 3.2 m³/min was sent to make fluidization. Thereafter, by warming inlet air to from 120° to 150° C., the temperature of the fluidizing sodium percarbonate was raised to 75° C. After the temperature was steady at 75° C., to keep it in a fluid state, a mixed solution of sodium carbonate and water-glass No. 1 (sodium carbonate concentration of 16.5 wt %, water-glass No. 1 of 3 wt % based on $SiO_2$) and an aqueous solution of magnesium sulfate (10 wt %) was sprayed simultaneously from different spray nozzles located 40 cm above the multipore plate.

Spraying of 8 kg of the mixed solution of sodium carbonate and water-glass No. 1 took about 76 minutes at a speed of 105 g/min. On the other hand, spraying of 1.8 kg of the aqueous solution of magnesium sulfate took 76 minutes at a speed of 23.7 g/min., and the coating finished at almost the same time. The temperature during the coating was controlled from 73° to 77° C. After completion of the coating, heated air continued to be sent for 5 minutes so that the sample dried. Next, heating from the air heater finished, and the sample was cooled with a cool air flow. After cooling, the coated sodium percarbonate was taken out, and no aggregate was observed.

The coating amount of each component as solids content was as follows:

$Na_2CO_3$: 1.32 kg (11.0% of the sodium percarbonate to be coated)

Water-glass No. 1 (as $SiO_2$): 0.24 kg (2.0% of the sodium percarbonate to be coated)

Magnesium sulfate: 0.18 kg (1.5% of the sodium percarbonate to be coated)

Active oxygen of the obtained sodium percarbonate, solubility and formulation stability were investigated. The results are shown in Table 2.

In the case of simultaneous spraying, solubility was a little bit slow as compared to the multi-spray case of Examples 6, 7 and 8.

EXAMPLE 10

Coated sodium percarbonate was obtained using the same procedures as in Example 9, except that a mixed solution of potassium carbonate and water-glass No. 3 was used instead of a mixed solution of sodium carbonate and water-glass No. 1.

Potassium carbonate: 1.32 Kg (11.0% of sodium percarbonate to be coated)

Water-glass No. 3 (as $SiO_2$): 0.24 Kg (2.0% of sodium percarbonate to be coated)

Magnesium sulfate: 0.18 Kg (1.5% of sodium percarbonate to be coated)

Active oxygen, solubility and formulation stability of the obtained sodium percarbonate were investigated, and the results are shown in Table 2. As can be understood from Table 2, sodium percarbonate produced according to the Example of the present invention was shown to be good in solubility (necessary time for complete dissolution was from 2 to 2.5 minutes) and good in formulation stability (after 21 days storage, only 10% was decomposed), and had a good balance in property.

COMPARATIVE EXAMPLE 7

Active oxygen, solubility and formulation stability of uncoated sodium percarbonate which was used as a raw material in the present invention were investigated. The results are shown in Table 2 for comparison.

COMPARATIVE EXAMPLE 8

Coated sodium percarbonate was obtained using the same procedures as in Example 6, except that the spraying of the second layer was not conducted.

Sodium carbonate: 33.0 g (11.0% of sodium percarbonate to be coated)

Water-glass No. 3 (as $SiO_2$): 6.0 g (2.0% of sodium percarbonate to be coated)

Active oxygen, solubility and formulation stability of the obtained sodium percarbonate were investigated. The results are shown in Table 2. The formulation stability did not show a great improvement like in Example 1.

COMPARATIVE EXAMPLE 9

Coated sodium percarbonate was obtained using the same procedures as in Example 6, except that the spraying of the first layer was not conducted.

Active oxygen, solubility and formulation stability of the obtained sodium percarbonate were investigated. The results are shown in Table 2. The formulation stability did not show a great improvement like in Example 6. Further, a great decrease of active oxygen which was over the value of dilution by the coating agent was observed.

Theoretical conc. of active oxygen:

$$14.4\% \times 1/(1+0.015) = 14.2\%$$

Actually measured conc. of active oxygen: 13.9%

COMPARATIVE EXAMPLE 10

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 $m^3$/min was sent to make fluidization. Thereafter, by warming inlet air, the temperature of the fluidizing sodium percarbonate was raised to 75° C. After the temperature was steady at 75° C., to keep it in a fluid state, 180 g of an aqueous solution of magnesium chloride (10% concentration of magnesium chloride) was sprayed from a spray nozzle located 10 cm above the multipore plate over 36 minutes at a flow rate of 5 g/min. After spray completion, the contents were removed from the apparatus, moved to a vacuum dryer, and dried for 4 hours at 50° C. under 3 mmHg.

Active oxygen, solubility and formulation stability of the obtained sodium percarbonate were investigated. The results are shown in Table 2. The formulation stability did not show a great improvement like in Example 6. In particular, the formulation stability with a zeolite was low, like the uncoated sample in COMPARATIVE EXAMPLE 6.

Further, a great decrease of active oxygen which was over the value of dilution by the coating agent was observed.

Theoretical conc. of active oxygen:

$$14.4\% \times 1/(1+0.06) = 13.6\%$$

Actually measured conc. of active oxygen: 12.9%

Also, the sample took 5 minutes to dissolve in COMPARATIVE EXAMPLE 9, so it is not applicable when laundry is conducted at a low temperature.

COMPARATIVE EXAMPLE 11

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 $m^3$/min was sent to make fluidization. Thereafter, by warming inlet air, the temperature of the fluidizing sodium percarbonate was raised to 50° C. After the temperature was steady at 50° C., to keep it in a fluid state, 150 g of an aqueous solution of a mixed salt of sodium carbonate and sodium sulfate (8.8% concentration of sodium carbonate, 11.2% of sodium sulfate) was sprayed from a spray nozzle located 10 cm above the multipore plate over 30 minutes at a flow rate of 5 g/min. For 10 minutes after spray completion, only gas at the same temperature continued to be sent, and drying was completed. Then, the gas was changed to cool wind, and the sample was cooled to 30° C. Then, the coated sodium percarbonate was removed from the apparatus, and little aggregates were observed.

Sodium carbonate: 13.2 g (4.4% of sodium percarbonate to be coated)

Sodium sulfate: 16.8 g (5.6% of sodium percarbonate to be coated)

Active oxygen, solubility and formulation stability of the obtained sodium percarbonate were investigated. The results are shown in Table 2. The solubility was preferable, but the formulation stability did not show a great improvement like in Example 6.

COMPARATIVE EXAMPLE 12

Coated sodium percarbonate was obtained using the same procedures as in Example 6, except that without using sodium carbonate, the first coating layer was formulated using only an aqueous solution of water-glass No. 1.

Water-glass No. 1 (as $SiO_2$): 39 g (13% of sodium percarbonate to be coated)

Magnesium sulfate: 4.5 g (1.5% of sodium percarbonate to be coated)

Active oxygen, solubility and formulation stability of the obtained sodium percarbonate were investigated. The results are shown in Table 2.

TABLE 2

|  | EXAMPLE | | | | | COMPARATIVE EXAMPLE | | | | | |
| --- | --- | --- | --- | --- | --- | --- | --- | --- | --- | --- | --- |
|  | 6 | 7 | 8 | 9 | 10 | 7 | 8 | 9 | 10 | 11 | 12 |
| Solubility (min.) | 2.5 | 2.5 | 2.5 | 2.0 | 2.5 | 1.5 | 3.0 | 3.5 | 5.0 | 1.5 | 10.0 |
| Storage Stability 1 (%) | 90 | 90 | 89 | 91 | 90 | 30 | 67 | 35 | 43 | 48 | 84 |
| Storage Stability 2 (%) | 91 | 90 | 87 | 90 | 90 | 50 | 62 | 55 | 75 | 55 | 67 |

EXAMPLE 11

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 $m^3$/min was sent to make fluidization. Thereafter, by warming inlet air, the temperature of the fluidizing sodium percarbonate was raised to 75° C. After the temperature was steady at 75° C., to keep it in a fluid state, 105 g of an aqueous solution of sodium metasilicate (concentration of 2 wt %, based on $SiO_2$) was sprayed from a spray nozzle located 10 cm above the multipore plate over 21 minutes at a flow rate of 5 g/min. After spray completion, the sample was dried for 5 minutes, and the first coating layer was thereby formed. Then, after a change of the nozzle, 100 g of a mixed solution of magnesium sulfate and sodium sulfate (magnesium sulfate of 4.2 wt %, sodium sulfate concentration of 15 wt %) was sprayed at a flow rate of 5 g/min over 20 minutes. After completion of the spraying, the sample was dried for 5 minutes, and the second coating layer was thereby formed. The temperature during coating was controlled from 73° to 77° C. The coating amount of each component as solids content was as follows:

Sodium metasilicate in the first coating layer: 2.1 g (as $SiO_2$: 0.7% of the sodium percarbonate to be coated)

Magnesium sulfate in the second coating layer: 4.2 g (1.4% of the sodium percarbonate to be coated)

Sodium sulfate in the second coating layer: 15.0 g (5.0% of the sodium percarbonate to be coated)

After cooling, the coated sodium percarbonate was taken out, and no aggregate was observed.

Active oxygen of the obtained sodium percarbonate analyzed to 13.4%.

This shows that there was no decomposition of the active oxygen at the coating time, and that the coating agent was coated the same as the theoretical value. (Theoretical value: 14.4%×1/(1+0.07)=13.5%)

The obtained sodium percarbonate was dissolved by 2.5 min.

Further, coated sodium percarbonate was mixed with a zeolite and detergent to investigate the storage stability test. The result together with the result of the solubility rate is shown in Table 3. Formulation stability was very good, and a great improvement of stability as compared with uncoated sodium percarbonate described below was recognized.

EXAMPLE 12

Coated sodium percarbonate was obtained using the same procedures as in Example 11, except that potassium sulfate was used instead of sodium sulfate.

Sodium metasilicate: 2.1 g (as $SiO_2$: 0.7% of the sodium percarbonate to be coated)

Potassium sulfate: 15.0 g (5% of the sodium percarbonate to be coated)

Magnesium sulfate: 4.2 g (1.4% of the sodium percarbonate to be coated)

Active oxygen of the obtained sodium percarbonate analyzed to 13.4%.

This value shows that without decomposing sodium percarbonate at the coating time, the coating agent was coated the same as the theoretical value. Further, solubility was investigated using the same procedure as in Example 11, and it was found that the sample dissolved by 2 minutes.

Formulation stability was investigated in the same manner as Example 11, and it was good. The result is shown in Table 3.

EXAMPLE 13

Coated sodium percarbonate was obtained using the same procedures as in Example 11, except that water-glass No. 1 was used instead of sodium metasilicate, the amount of coating agent was changed, and EDTA-4Na to the sodium percarbonate particle was added (0.6% conc.) into a mixed solution of magnesium sulfate and sodium sulfate in order to stabilize the liquid.

Water-glass No. 1: 4.5 g (as $SiO_2$, 1.5% of sodium percarbonate to be coated)

Sodium sulfate: 15.0 g (5.0% of sodium percarbonate to be coated)

Magnesium sulfate: 4.2 g (1.4% of sodium percarbonate to be coated)

Ethylenediaminetetraacetic acid tetrasodium salt: 0.6 g (0.2% of sodium percarbonate to be coated)

Active oxygen of the obtained sodium percarbonate, solubility and formulation stability were investigated. The solubility was excellent, and formulation stability was good as in Example 1. The results are shown in Table 3.

EXAMPLE 14

12 kg of sodium percarbonate having a mean diameter of 500 µm (active oxygen: 14.4%) was placed on a multipore plate of a fluid drying apparatus (Fuji Paudal Co., Ltd., "MIDGET-DRYER"), then air at 3.2 m³/min was sent to make fluidization. Thereafter, by warming inlet air to from 120° to 150° C., the temperature of the fluidizing sodium percarbonate was raised to 75° C. After the temperature was steady at 75° C., to keep it in a fluid state, a mixed solution of sodium sulfate and magnesium sulfate (sodium sulfate concentration of 15 wt %, magnesium sulfate concentration of 4.3 wt %) and an aqueous solution of sodium metasilicate (4 wt % as $SiO_2$) was sprayed simultaneously from a spray nozzle located 40 cm above the multipore plate, wherein 5.6 kg of the mixed solution of sodium sulfate and magnesium sulfate was sprayed at a speed of 90 g/min and 2.1 kg of the aqueous solution of sodium metasilicate was sprayed at a speed of 34 g/min, both for 62 minutes. After completion of the coating, heated air continued to be sent for 5 minutes so that the sample dried. Next, heating from the air heater finished, and the sample was cooled with a cool air flow. The temperature was controlled at from 73° to 77° C. After cooling, the coated sodium percarbonate was removed, and no aggregate was observed.

The coating amount of each component as solids content was as follows:

Sodium sulfate: 840 g (0.7% of the sodium percarbonate to be coated)

Sodium metasilicate: 84 g (as $SiO_2$: 0.7% of the sodium percarbonate to be coated)

Magnesium sulfate: 168 g (1.4% of the sodium percarbonate to be coated)

Active oxygen, solubility and formulation stability of the obtained sodium percarbonate were investigated. The results are shown in Table 3.

In the case of simultaneous spraying, the solubility and formulation stability were good, similar to the multi-spray case of Examples 11, 12 and 13.

EXAMPLE 15

Simultaneous spraying over 89 minutes using the same procedures as in Example 14 was conducted, except that EDTA-4Na (0.3 wt %) to sodium sulfate particle was added into a mixed solution of sodium sulfate and magnesium sulfate, the amount of coating agent was changed, water-glass No. 1 was used instead of sodium metasilicate, and the concentration was changed.

Sodium sulfate: 1200 g (10.0% of sodium percarbonate to be coated)

Water-glass No. 1: 84 g (as $SiO_2$, 0.7% of sodium percarbonate to be coated)

Magnesium sulfate: 240 g (2.0% of sodium percarbonate to be coated)

Ethylenediaminetetraacetic acid tetrasodium salt: 24 g (0.2% of sodium percarbonate to be coated)

Active oxygen, solubility and formulation stability of the obtained sodium percarbonate were investigated, and the results are shown in Table 3. As can be understood from Table 2, sodium percarbonate produced according to the Example of the present invention was shown to be good in solubility (necessary time for 100% dissolution was from 2 to 2.5 minutes, i.e., fast) and good in formulation stability with detergent (after 21 days storage, only 10% was decomposed), and had a good balance in property.

EXAMPLE 16

Coated sodium percarbonate was obtained using the same procedures as in Example 11, except that mixed aqueous solution of magnesium sulfate, sodium sulfate and sodium bicarbonate( 4.2% by weight of magnesium sulfate, 10% by weight of sodium sulfate and 5% by weight of sodium bicarbonate) was used instead of mixed aqueous solution of magnesium sulfate and sodium sulfate.

Sodium metasilicate: 2.1 g (as $SiO_2$, 0.7% of sodium percarbonate to be coated)

Magnesium sulfate: 4.2 g (1.4% of sodium percarbonate to be coated)

Sodium sulfate: 10.0 g (3.3% of sodium percarbonate to be coated)

Sodium carbonate: 5.0 g (1.7% of sodium percarbonate to be coated)

Active oxygen of the obtained sodium percarbonate was analyzed to 13.4%. Further, solubility and formulation stability were investigated, and the solubility was excellent, and formulation stability was good as in Example 11. The results are shown in Table 3.

COMPARATIVE EXAMPLE 13

Active oxygen, solubility and formulation stability of uncoated sodium percarbonate which was used as a raw material in the present invention were investigated. The results are shown in Table 3 for comparison.

COMPARATIVE EXAMPLE 14

Coated sodium percarbonate was obtained using the same procedures as in Example 11, except that the spraying of the mixed solution of magnesium sulfate and sodium sulfate for the second layer was not conducted.

Sodium metasilicate: 2.1 g (as $SiO_2$, 0.7% of sodium percarbonate to be coated)

Active oxygen, solubility and formulation stability of the obtained sodium percarbonate was investigated. The results are shown in Table 3. The formulation stability was a little bit better than the uncoated sample of COMPARATIVE EXAMPLE 11, but did not show a great improvement like in EXAMPLE 1.

COMPARATIVE EXAMPLE 15

Coated sodium percarbonate was obtained using the same procedures as in Example 11, except that the spraying of aqueous solution of sodium metasilicate for the first layer was not conducted.

Active oxygen, solubility and formulation stability of the obtained sodium percarbonate were investigated. The results are shown in Table 3. The formulation stability did not show a great improvement like in Example 11.

COMPARATIVE EXAMPLE 16

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 $m^3$/min was sent to make fluidization. Thereafter, by warming inlet air, the temperature of the fluidizing sodium percarbonate was raised to 75° C. After the temperature was steady at 75° C., to keep it in a fluid state, 180 g of an aqueous solution of magnesium chloride (10% concentration of magnesium chloride) was sprayed from a spray nozzle located 10 cm above the multipore plate over 36 minutes at a flow rate of 5 g/min. After vacuum drying, active oxygen, solubility and formulation stability of the obtained sodium percarbonate were investigated. The results are shown in Table 3. The formulation stability did not show a great improvement like in Example 11. In particular, the formulation stability with a zeolite was low, like the uncoated sample in COMPARATIVE EXAMPLE 11. Further, a great decrease of active oxygen which was over the value of dilution by the coating agent was observed.

Theoretical conc. of active oxygen:

$$14.4\% \times 1/(1+0.06) = 13.6\%$$

Actually measured conc. of active oxygen: 12.9%

COMPARATIVE EXAMPLE 17

300 g of sodium percarbonate having a mean diameter of 500 μm (active oxygen: 14.4%) was placed on a multipore plate of a fluid dry coater (Yamato Scientific Co., Ltd., PULVIS MINI BED), then air at 0.25 $m^3$/min was sent to make fluidization. Thereafter, by warming inlet air, the temperature of the fluidizing sodium percarbonate was raised to 50° C. After the temperature was steady at 50° C., to keep it in a fluid state, 150 g of an aqueous solution of a mixed salt of sodium carbonate and sodium sulfate (8.6% concentration of sodium carbonate, 11.2% of sodium sulfate) was sprayed from a spray nozzle located 10 cm above the multipore plate over 30 minutes at a flow rate of 5 g/min. For 10 minutes after spray completion, only gas at the same temperature continued to be sent, and drying was completed. Then, the gas was changed to cool wind, and the sample was cooled to 30° C. Then, the coated sodium percarbonate was removed from the apparatus, and little aggregates were observed.

Sodium sulfate: 16.8 g (5.6% of sodium percarbonate to be coated)

Sodium carbonate: 13.2 g (4.4% of sodium percarbonate to be coated)

Active oxygen, solubility and formulation stability of the obtained sodium percarbonate were investigated. The results are shown in Table 3. Formulation stability did not show a great improvement like in Example 11.

COMPARATIVE EXAMPLE 18

Coated sodium percarbonate was obtained using the same procedures as in Example 6, except that after forming the first coating layer, without using sodium sulfate, the second coating layer was formulated using only an aqueous solution of magnesium sulfate.

Sodium metasilicate (as $SiO_2$): 2.1 g (0.7% of sodium percarbonate to be coated)

Magnesium sulfate: 19.2 g (6.4% of sodium percarbonate to be coated)

Active oxygen, solubility and formulation stability of the obtained sodium percarbonate were investigated. The results are shown in Table 3.

COMPARATIVE EXAMPLE 19

Coated sodium percarbonate was obtained using the same procedures as in Example 6, except that after forming the first coating layer, without using magnesium sulfate, the second coating layer was formulated using a mixed aqueous solution of sodium sulfate and sodium carbonate.

Sodium metasilicate (as $SiO_2$): 2.1 g (0.7% of sodium percarbonate to be coated)

Sodium sulfate: 15.0 g (5.0% of sodium percarbonate to be coated)

Sodium carbonate: 4.2 g (1.4% of sodium percarbonate to be coated)

Active oxygen, solubility and formulation stability of the obtained sodium percarbonate were investigated. The results are shown in Table 3.

TABLE 3

|  | EXAMPLE | | | | | | COMPARATIVE EXAMPLE | | | | | | |
| --- | --- | --- | --- | --- | --- | --- | --- | --- | --- | --- | --- | --- | --- |
|  | 11 | 12 | 13 | 14 | 15 | 16 | 13 | 14 | 15 | 16 | 17 | 18 | 19 |
| Solubility (min.) | 2.0 | 2.0 | 2.5 | 2.5 | 2.5 | 2.5 | 1.5 | 3.5 | 1.5 | 5.0 | 1.5 | 4.0 | 3.0 |
| Storage Stability 1 (%) | 95 | 91 | 93 | 95 | 96 | 96 | 30 | 50 | 79 | 43 | 48 | 68 | 72 |
| Storage Stability 2 (%) | 91 | 89 | 90 | 92 | 93 | 95 | 50 | 54 | 68 | 75 | 55 | 72 | 70 |

While the invention has been described in detail and with reference to specific embodiments, it will be apparent to one skilled in the art that changes and modifications can be made therein without departing from the spirit and scope thereof.

What is claimed is:

1. A stabilized sodium percarbonate particle comprising a sodium percarbonate particle having at least one coating layer thereon, wherein the at least one coating layer comprises:

(a) a silicate;

(b) magnesium sulfate; and, (c) an alkali metal salt selected from the group consisting of alkali metal carbonates, alkali metal bicarbonates and alkali metal sulfates.

2. A stabilized sodium percarbonate particle according to claim 1, wherein the silicate is selected from the group consisting of sodium orthosilicate, sodium metasilicate and water-glass.

3. A stabilized sodium percarbonate particle according to claim 1, wherein the coated sodium percarbonate particle comprises a mixture of a wet powdery sodium percarbonate particle and a recovered sodium percarbonate particle which partially contains a coating agent component.

4. A stabilized sodium percarbonate particle according to claim 1, wherein the silicate is coated on the sodium percarbonate in an amount of from 0.01 mole to 0.06 mole based on $SiO_2$ per mole of sodium percarbonate.

5. A stabilized sodium percarbonate particle according to claim 1, wherein the magnesium sulfate is coated on the sodium percarbonate in an amount of from 0.006 mole to 0.06 mole based on $SiO_2$ per mole of sodium percarbonate.

6. A stabilized sodium percarbonate particle according to claim 1, wherein a chelating agent is contained in the at least one coating layer.

7. A stabilized sodium percarbonate particle according to claim 1, wherein the alkali metal salt is an alkali metal carbonate.

8. A stabilized sodium percarbonate particle according to claim 7, wherein the alkali metal carbonate is sodium carbonate.

9. A stabilized sodium percarbonate particle according to claim 1, wherein a mixed solution of an alkali metal carbonate and a silicate is sprayed and dried to form a first coating layer, then an aqueous solution of magnesium sulfate is sprayed and dried to form a second coating layer.

10. A stabilized sodium percarbonate particle according to claim 7, wherein the at least one coating layer is a coating layer formed by spraying (a) a mixed aqueous solution of an alkali metal carbonate and a silicate, and (b) an aqueous solution of magnesium sulfate on the sodium percarbonate particle simultaneously using different nozzles and drying.

11. A stabilized sodium percarbonate particle according to claim 7, wherein the at least one coating layer is a coating layer formed by spraying (a) an alkali metal carbonate, (b) a silicate, and (c) an aqueous solution of magnesium sulfate on the sodium percarbonate particle simultaneously using different nozzles and drying.

12. A stabilized sodium percarbonate particle according to claim 7, wherein the alkali metal carbonate is coated on the sodium percarbonate particle in an amount of from 0.075 mole to 0.18 mole per mole of sodium percarbonate.

13. A stabilized sodium percarbonate particle according to claim 7, wherein the silicate and the alkali metal carbonate are coated on the sodium percarbonate particle in amounts such that the coating amount of the silicate is from 0.05 to 0.8 times the coating amount of the alkali metal carbonate on a molar basis.

14. A stabilized sodium percarbonate particle according to claim 7, wherein the magnesium sulfate and the alkali metal carbonate are coated on the sodium percarbonate particle in amounts such that the coating amount of the magnesium sulfate is from 0.03 to 0.8 times the coating amount of the alkali metal carbonate on a molar basis.

15. A stabilized sodium percarbonate particle according to claim 1, wherein the alkali metal salt is an alkali metal bicarbonate.

16. A stabilized sodium percarbonate particle according to claim 15, wherein the alkali metal bicarbonate is sodium bicarbonate.

17. A stabilized sodium percarbonate particle according to claim 15, wherein an aqueous solution of a silicate is sprayed and dried to form a first coating layer, then a mixed aqueous solution of magnesium sulfate and an alkali metal bicarbonate is sprayed and dried to form the second coating layer.

18. A stabilized sodium percarbonate particle according to claim 15, wherein the at least one coating layer is formed by spraying (a) an aqueous solution of silicate, and (b) a mixed aqueous solution of magnesium sulfate and an alkaline metal bicarbonate on the sodium percarbonate particle simultaneously using different nozzles and drying.

19. A stabilized sodium percarbonate particle according to claim 15, wherein the at least one coating layer is a coating layer formed by spraying (a) an aqueous solution of a silicate, (b) an aqueous solution of magnesium sulfate, and (c) an alkali metal bicarbonate on the sodium percarbonate particle simultaneously using different nozzles and drying.

20. A stabilized sodium percarbonate particle according to claim 15, wherein the alkali metal bicarbonate is coated on the sodium percarbonate particle in an amount of from 0.05 mole to 0.25 mole per mole of sodium percarbonate.

21. A stabilized sodium percarbonate particle according to claim 15, wherein the silicate and the alkali metal bicarbonate are coated on the sodium percarbonate particle in amounts such that the coating amount of the silicate is from 0.04 to 1.2 times the coating amount of the alkali metal bicarbonate on a molar basis.

22. A stabilized sodium percarbonate particle according to claim 15, wherein the magnesium sulfate and the alkali metal bicarbonate are coated on the sodium percarbonate particle in amounts such that the coating amount of the magnesium sulfate is from 0.024 to 1.2 times the coating amount of the alkali metal bicarbonate on a molar basis.

23. A stabilized sodium percarbonate particle according to claim 1, wherein the alkali metal salt is an alkali metal sulfate.

24. A stabilized sodium percarbonate particle according to claim 23, wherein the alkali metal sulfate is sodium sulfate.

25. A stabilized sodium percarbonate particle according to claim 23, wherein an aqueous solution of a silicate is sprayed and dried to form a first coating layer, then a mixed aqueous solution of magnesium sulfate and alkali metal sulfate is sprayed and dried to form a second coating layer.

26. A stabilized sodium percarbonate particle according to claim 23, wherein the at least one coating layer is a coating layer formed by spraying (a) an aqueous solution of a silicate, and (b) a mixed aqueous solution of magnesium sulfate and an alkali metal sulfate on the sodium percarbonate particle simultaneously using different nozzles and drying.

27. A stabilized sodium percarbonate particle according to claim 23, wherein the at least one coating layer is a coating layer formed by spraying (a) an aqueous solution of a silicate, (b) an aqueous solution of magnesium sulfate, and (c) an alkali metal sulfate on the sodium percarbonate particle simultaneously using different nozzles and drying.

28. A stabilized sodium percarbonate particle according to claim 23, wherein the alkali metal sulfate is coated on the sodium percarbonate particle in an amount of from 0.05 mole to 0.2 mole per mole of sodium percarbonate.

29. A stabilized sodium percarbonate particle according to claim 23, wherein the silicate and the alkali metal sulfate are coated on the sodium percarbonate particle in amounts such that the coating amount of the silicate is from 0.05 to 1.2 times the coating amount of the alkali metal sulfate on a molar basis.

30. A stabilized sodium percarbonate particle according to claim 23, wherein the magnesium sulfate and the alkali metal sulfate are coated on the sodium percarbonate particle in amounts such that the coating amount of the magnesium sulfate is from 0.03 to 1.2 times the coating amount of the alkali metal sulfate on a molar basis.

31. A stabilized sodium percarbonate particle according to claim 23, wherein an alkali metal bicarbonate is added as a coating agent.

32. A stabilized sodium percarbonate particle according to claim 31, wherein the alkali metal bicarbonate is sodium bicarbonate.

33. A stabilized sodium percarbonate particle according to claim 31, wherein an aqueous solution of a silicate is sprayed and dried to form a first coating layer, then a mixed aqueous solution of magnesium sulfate, an alkali metal sulfate and an alkali metal bicarbonate is sprayed and dried to form a second coating layer.

34. A stabilized sodium percarbonate particle according to claim 31, wherein the at least one coating layer is a coating layer formed by spraying (a) an aqueous solution of a silicate, and (b) a mixed aqueous solution of magnesium sulfate, an alkali metal sulfate and an alkali metal bicarbonate on the sodium percarbonate particle simultaneously using different nozzles and drying.

35. A stabilized sodium percarbonate particle according to claim 31, wherein the at least one coating layer is a coating layer formed by spraying (a) an aqueous solution of a silicate, (b) an aqueous solution of magnesium sulfate, (c) an alkali metal sulfate, and (d) an alkali metal bicarbonate on the sodium percarbonate particle simultaneously using different nozzles and drying.

36. A stabilized sodium percarbonate particle according to claim 31, wherein the alkali metal sulfate is coated on the sodium percarbonate particle in an amount of from 0.05 mole to 0.2 mole per mole of sodium percarbonate, and the alkali metal bicarbonate is coated on the sodium percarbonate in an amount of from 0.04 mole to 0.17 mole per mole of sodium percarbonate.

37. A stabilized sodium percarbonate particle according to claim 31, wherein the silicate and the alkali metal sulfate are coated on the sodium percarbonate particle in amounts such that the coating amount of the silicate is from 0.05 to 1.2 times the coating amount of the alkali metal sulfate on a molar basis.

38. A stabilized sodium percarbonate particle according to claim 31, wherein the magnesium sulfate and the alkali metal sulfate are coated on the sodium percarbonate particle in amounts such that the coating amount of the magnesium sulfate is from 0.03 to 1.2 times the coating amount of the alkali metal sulfate on a molar basis.

39. A stabilized sodium percarbonate particle according to claim 31, wherein the alkali metal bicarbonate and the alkali metal sulfate are present in amounts such that the amount of the alkali metal bicarbonate is from 0.2 to 0.85 times the amount of the alkali metal sulfate on a molar basis.

* * * * *